(12) United States Patent
Lewis et al.

(10) Patent No.: US 8,112,678 B1
(45) Date of Patent: *Feb. 7, 2012

(54) ERROR CORRECTION FOR PROGRAMMABLE LOGIC INTEGRATED CIRCUITS

(75) Inventors: David Lewis, Toronto (CA); Vaughn Betz, Toronto (CA)

(73) Assignee: Altera Corporation, San Jose, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/955,910

(22) Filed: Dec. 13, 2007

Related U.S. Application Data

(63) Continuation of application No. 10/766,464, filed on Jan. 27, 2004, now Pat. No. 7,328,377.

(51) Int. Cl.
*G06F 11/00* (2006.01)
(52) U.S. Cl. .......................................... 714/48
(58) Field of Classification Search ................ 714/48
See application file for complete search history.

(56) References Cited

U.S. PATENT DOCUMENTS

| | | |
|---|---|---|
| 4,005,405 A | 1/1977 | West |
| 4,375,664 A | 3/1983 | Kim |
| 4,866,717 A | 9/1989 | Murai et al. |
| 4,930,098 A | 5/1990 | Allen |
| 4,930,107 A | 5/1990 | Chan et al. |
| 4,940,909 A | 7/1990 | Mulder et al. |
| 5,111,464 A | 5/1992 | Farmwald et al. |
| 5,200,920 A | 4/1993 | Norman et al. |
| 5,237,219 A | 8/1993 | Cliff |
| 5,291,079 A | 3/1994 | Goetting |
| 5,305,324 A | 4/1994 | Demos |
| 5,321,704 A | 6/1994 | Erickson et al. |
| 5,349,691 A | 9/1994 | Harrison et al. |
| 5,426,379 A | 6/1995 | Trimberger |
| 5,430,687 A | 7/1995 | Hung et al. |
| 5,466,117 A | 11/1995 | Resler et al. |
| 5,495,491 A | 2/1996 | Snowden et al. |
| 5,511,211 A | 4/1996 | Akao et al. |
| 5,528,176 A | 6/1996 | Kean |
| 5,543,730 A | 8/1996 | Cliff et al. |

(Continued)

FOREIGN PATENT DOCUMENTS
EP 0 291 167 11/1988

(Continued)

OTHER PUBLICATIONS

"Antifuse FPGA shoots for the stars," *EDN*, vol. 48, No. 12, May 29, 2003, p. 20.

(Continued)

*Primary Examiner* — Amine Riad
(74) *Attorney, Agent, or Firm* — Ropes & Gray LLP

(57) ABSTRACT

Systems and methods for detecting and correcting errors in programmable logic ICs are provided. In one embodiment, a scrubber periodically reads the memory cells in a programmable logic IC, detects and corrects any errors, and writes the corrected contents back into the memory cell. In another embodiment, regions of memory cells in a programmable logic IC each have associated error correcting circuitry which operates to continuously detect and correct errors as they occur. Error correcting circuitry can further be designed to reduce static hazards. It may be more desirable to design programmable logic IC routing architectures that reduce the number of memory cells needed to implement a given function. Error correcting circuitry can be provided for configuration memory or for an embedded memory block on a programmable logic IC.

23 Claims, 14 Drawing Sheets

U.S. PATENT DOCUMENTS

| | | |
|---|---|---|
| 5,552,722 A | 9/1996 | Kean |
| 5,581,198 A | 12/1996 | Trimberger |
| 5,588,112 A | 12/1996 | Dearth et al. |
| 5,590,305 A | 12/1996 | Terrill et al. |
| 5,598,424 A | 1/1997 | Erickson et al. |
| 5,598,530 A | 1/1997 | Nagae |
| 5,606,276 A | 2/1997 | McClintock |
| 5,608,342 A | 3/1997 | Trimberger |
| 5,629,949 A | 5/1997 | Zook |
| 5,640,106 A | 6/1997 | Erickson et al. |
| 5,650,734 A | 7/1997 | Chu et al. |
| 5,670,897 A | 9/1997 | Kean |
| 5,680,061 A | 10/1997 | Veenstra et al. |
| 5,691,907 A | 11/1997 | Resler et al. |
| 5,694,056 A | 12/1997 | Mahoney et al. |
| 5,694,399 A | 12/1997 | Jacobson et al. |
| 5,696,454 A | 12/1997 | Trimberger |
| 5,742,531 A | 4/1998 | Freidin et al. |
| 5,754,566 A | 5/1998 | Christopherson et al. |
| 5,767,734 A | 6/1998 | Vest et al. |
| 5,773,993 A | 6/1998 | Trimberger |
| 5,798,656 A | 8/1998 | Kean |
| 5,821,772 A | 10/1998 | Ong et al. |
| 5,838,167 A | 11/1998 | Erickson et al. |
| 5,844,829 A | 12/1998 | Freidin et al. |
| 5,844,854 A | 12/1998 | Lee |
| 5,869,980 A | 2/1999 | Chu et al. |
| 5,873,113 A | 2/1999 | Rezvani |
| 5,949,987 A | 9/1999 | Curd et al. |
| 5,961,576 A | 10/1999 | Freidin et al. |
| 5,978,952 A | 11/1999 | Hayek et al. |
| 5,995,744 A | 11/1999 | Guccione |
| 5,995,988 A | 11/1999 | Freidin et al. |
| 5,999,014 A | 12/1999 | Jacobson et al. |
| 6,011,406 A | 1/2000 | Veenstra |
| 6,018,250 A | 1/2000 | Chiang et al. |
| 6,023,565 A | 2/2000 | Lawman et al. |
| 6,024,486 A | 2/2000 | Olarig et al. |
| 6,028,445 A | 2/2000 | Lawman |
| 6,044,025 A | 3/2000 | Lawman |
| 6,049,222 A | 4/2000 | Lawman |
| 6,052,755 A | 4/2000 | Terrill et al. |
| 6,057,704 A | 5/2000 | New et al. |
| 6,065,146 A | 5/2000 | Bosshart |
| 6,069,489 A | 5/2000 | Iwanczuk et al. |
| 6,097,210 A | 8/2000 | Iwanczuk et al. |
| 6,101,614 A | 8/2000 | Gonzales et al. |
| 6,105,105 A | 8/2000 | Trimberger |
| 6,128,215 A | 10/2000 | Lee |
| 6,137,307 A | 10/2000 | Iwanczuk et al. |
| 6,154,048 A | 11/2000 | Iwanczuk et al. |
| 6,184,705 B1 | 2/2001 | Cliff et al. |
| 6,191,614 B1 | 2/2001 | Schultz et al. |
| 6,201,406 B1 | 3/2001 | Iwanczuk et al. |
| 6,204,687 B1 | 3/2001 | Schultz et al. |
| 6,216,259 B1 | 4/2001 | Guccione et al. |
| 6,223,309 B1 | 4/2001 | Dixon et al. |
| 6,237,124 B1 | 5/2001 | Plants |
| 6,242,941 B1 | 6/2001 | Vest et al. |
| 6,279,128 B1 | 8/2001 | Arnold et al. |
| 6,314,550 B1 | 11/2001 | Wang et al. |
| 6,349,390 B1 | 2/2002 | Dell et al. |
| 6,429,682 B1 | 8/2002 | Schultz et al. |
| 6,560,743 B2 * | 5/2003 | Plants ............................ 714/763 |
| 6,701,480 B1 | 3/2004 | Karpuszka et al. |
| 6,832,340 B2 | 12/2004 | Larson et al. |
| 6,838,899 B2 | 1/2005 | Plants |
| 6,839,868 B1 | 1/2005 | Pignol |
| 6,845,472 B2 * | 1/2005 | Walker et al. .................. 714/42 |
| 6,847,554 B2 | 1/2005 | Satori |
| 6,848,063 B2 | 1/2005 | Rodeheffer et al. |
| 6,859,904 B2 | 2/2005 | Kocol et al. |
| 7,007,203 B2 | 2/2006 | Gorday et al. |
| 7,030,647 B1 * | 4/2006 | White et al. .................... 326/38 |
| 7,058,800 B2 * | 6/2006 | Farkas .......................... 713/100 |
| 7,058,880 B1 | 6/2006 | Ding et al. |
| 7,328,377 B1 * | 2/2008 | Lewis et al. .................... 714/48 |
| 7,375,551 B1 * | 5/2008 | White et al. .................... 326/40 |
| 7,479,803 B1 * | 1/2009 | Wageningen et al. .......... 326/46 |
| 7,710,147 B1 * | 5/2010 | White et al. .................... 326/38 |
| 7,795,909 B1 * | 9/2010 | Daxer et al. .................... 326/39 |
| 2003/0097628 A1 | 5/2003 | Ngo et al. |
| 2004/0230767 A1 | 11/2004 | Bland et al. |
| 2005/0040844 A1 | 2/2005 | Plants |
| 2005/0044467 A1 | 2/2005 | Leung et al. |
| 2005/0073884 A1 | 4/2005 | Gonzalez et al. |
| 2005/0144551 A1 | 6/2005 | Nahas |
| 2005/0154943 A1 | 7/2005 | Alexander et al. |
| 2006/0123327 A1 * | 6/2006 | Foss et al. ..................... 714/800 |

FOREIGN PATENT DOCUMENTS

| | | |
|---|---|---|
| EP | 0 838 969 | 4/1998 |
| EP | 1 100 020 | 5/2001 |
| JP | 61-101857 | 5/1986 |
| JP | 62-251949 | 11/1987 |
| WO | WO98/29811 | 7/1998 |

OTHER PUBLICATIONS

"Tradeoffs abound in FPGA design: understanding device types and design flows is key to getting the most out of FPGAs," *Electronic Design*, vol. 51, No. 27, Dec. 4, 2003, p. S1.

Ahrens et al., "Predictive Maintenance for Prevention of Uncorrectable Multiple BIT Errors in Memory," IP.com, Prior Art Database, Jan. 28, 2005, pp. 1-5 (originally published: *IBM TDB*, Aug. 1, 1989, pp. 239-244).

Bazes et al., "Programmable NMPS DRAM Controller for Microcomputer Systems with Dual-port Memory and Error Checking and Correction," *IEEE Journal of Solid-State Circuits*, vol. SC-18, No. 2, Apr. 1983, Abstract.

Huang et al., "A memory coherence technique for online transient error recovery of FPGA configurations," *Proceedings of the 2001 ACM/SIGDA 9th International Symposium on Field Programmable Gate Arrays*, Feb. 11-13, 2001, pp. 183-192.

Johnson, "Multibit error correction in a monolithic semiconductor memory," IP.com Prior Art Database, Sep. 8, 2003, pp. 1-10.

Mahmood et al., "Concurrent Error Detection Using Watchdog Processors—A Survey," *IEEE Transactions on Computers*, vol. 37, No. 2, Feb. 1998, Abstract.

Matsumoto, "Million-gate architecture will vie with ASIC-like approach from Altera, Lucent and GateField—size matters, says Xilinx with Virtex launch," *Electronic Engineering Times*, Oct. 26, 1998.

Michinishi et al., "Testing for the programming circuit of SRAM-based FPGAs," *IEICE Transactions on Information and Systems*, vol. E82-D, No. 6, 1999, Abstract.

Tiwari et al., "Enhanced Reliability of Finite-State Machines in FPGA Through Efficient Fault Detection and Correction," *IEEE Transactions on Reliability*, vol. 54, No. 3, Sep. 2005, pp. 459-467.

Wang et al., "SRAM Based Re-programmable FPGA for Space Applications," *IEEE Transactions on Nuclear Science*, vol. 46, No. 6, Dec. 1999, pp. 1728-1735.

Xilinx, Inc., *The Programmable Logic Data Book 1999*, pp. 4-31 to 4-37, 6-49 to 6-57, and 7-104 to 7-113.

Xilinx, Inc., *Application Note: FPGAS*, "Correcting Single-Event Upsets Through Virtex Partial Configuration," XAPP216 (v1.0), Jun. 1, 2000, pp. 1-12.

Xilinx, Inc., *Application Note: Virtex Series*, "Virtex FPGA Series Configuration and Readback," XAPP138 (v2.7), Jul. 1, 2002, pp. 1-39.

\* cited by examiner

ERROR CORRECTION FOR PROGRAMMABLE LOGIC INTEGRATED CIRCUITS

CROSS REFERENCE TO RELATED APPLICATION

This is a continuation of commonly-assigned U.S. patent application Ser. No. 10/766,464, filed Jan. 27, 2004, now U.S. Pat. No. 7,328,377.

BACKGROUND OF THE INVENTION

This invention relates to programmable logic integrated circuits (ICs). More particularly, this invention relates to providing error correction for programmable logic ICs.

A programmable logic IC is a general-purpose circuit that is programmable to perform any of a wide range of logic tasks. Known examples of programmable logic IC technology include programmable logic devices (PLDs), complex programmable logic devices (CPLDs), and field programmable gate arrays (FPGAs). Memory blocks may be provided on programmable logic integrated circuits and are used to store and subsequently output data or to perform various functions desired by the user.

A programmable logic IC typically includes a large number of memory cells that store configuration data. When data is being programmed into the memory cells or while data is stored in the memory cells, errors can occur in the representation of the configuration data. Such errors can include hard errors and soft errors. Hard errors arise due to physical imperfections in a programmable logic IC or due to physical damage to a programmable logic IC. A soft error occurs when, during operation of a programmable logic IC, an alpha particle or cosmic ray strikes the silicon of the programmable logic IC, causing the formation of electron-hole pairs that alters the contents of a memory cell.

With advances in process technology, programmable logic ICs become more susceptible to soft errors because of the decrease in physical dimensions of memory cells, thus resulting in an increase in the number of memory cells that can be placed on a programmable logic IC. A soft error directly affects the logic functionality of the programmable logic IC, thereby causing logic failure. Currently, there are no available methods for detecting and correcting such errors in programmable logic ICs without requiring the use of external logic.

In view of the foregoing, it would be desirable to provide systems and methods for detecting and correcting errors in programmable logic ICs without the use of external logic.

SUMMARY OF THE INVENTION

In accordance with the invention, systems and methods for detecting and correcting errors in programmable logic ICs without the use of external logic are provided.

In one embodiment, a scrubber periodically reads all the memory cells (e.g., a column at a time, a portion of the column at a time, more than one column at a time) in a programmable logic IC, detects and corrects any errors, and writes the corrected contents back into the respective memory cells. The scrubber uses error correction techniques such as a Hamming Code, Reed-Solomon Code, or Product Code. Dedicated memory cells in the programmable logic IC store error check bits that are used to determine whether an error has occurred in any of the memory cells. For example, each column of memory cells includes data bits and associated error check bits. A column of memory cells can be read into a data register and processed in error correcting circuitry to determine whether an error has occurred. If an error is detected, the data bit is corrected and written back into the corresponding memory cell. There can be one error correcting circuit associated with all the memory cells in a programmable logic IC. Alternatively, the memory cells in the programmable logic IC can be divided into multiple regions, with each region having dedicated error correcting circuitry.

In another embodiment, regions of memory cells in a programmable logic IC each has associated error correcting circuitry which operates to continuously detect and correct errors as they occur. The error correcting circuitry checks all the memory cells in a given region at the same time. For each region of memory cells, one column and one row of memory cells can be used to store a parity bit that results in the corresponding column and row of memory cells having an even parity or odd parity. Each memory cell includes logic gates that are used to compute the parity for a given row and column and if an error is detected, the correct output is generated. Other circuitry, such as a scrubber, can then be used to write the correct output into the corresponding memory cell.

In a further embodiment, error correcting circuitry can be provided that reduces static hazards resulting because of different propagation times for different paths. In one approach, a horizontal parity bit and a vertical parity bit are computed that include all the memory cells in that row and column except for the memory cell being corrected. A corrected value is computed based on the horizontal parity bit, the vertical parity bit, and the contents of the memory cell being corrected. In another approach, which uses fewer logic gates, a triple redundancy method can be implemented. Each bit of the configuration data is stored in three memory cells. Error correcting circuitry is provided that determines what same bit value is in all, or in a majority (e.g., 2 memory cells), of the three memory cells, which is then sent as output. In yet another approach, the static hazard can be minimized by slowing the logic stage of error correcting circuitry so that any possible glitch is absorbed by the logic. This can be achieved by using a logic gate with a weak drive combined with a large capacitive load. A resistive element such as a polysilicon wire, a current starved pass gate, or a current starved inverter can be used with a capacitor to increase the time delay for the error correcting circuitry.

In some instances, it may be desirable to design programmable logic IC routing architectures that reduce the number of memory cells needed to implement a given function. For example, for multiplexers that are commonly used in existing programmable logic IC architectures, error correcting circuitry can be used with encoded circuitry that results in a smaller number of memory cells needed to control the operation of the multiplexers.

In addition to providing error correcting circuitry for configuration memory, error correcting circuitry can be used to correct errors in an embedded memory block on a programmable logic IC. The error correcting circuitry can be implemented in hardware on the embedded memory block or alternatively, in soft logic in the programmable logic IC.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

The present invention provides systems and methods for detecting and correcting errors in programmable logic ICs without the use of external logic. Programmable logic ICs include, for example, programmable logic devices, complex programmable logic devices, field-programmable gate arrays, or other suitable programmable devices. Errors include soft errors, hard errors, or both.

A programmable logic IC holds data to program that programmable logic IC to implement any of one or more various applications. This data is referred to herein as configuration data. The configuration data is represented as a set of binary digits (i.e., binary "1's" and "0's") and may be stored in any suitable memory such as, for example, a configuration random access memory (CRAM). Alternatively, the programmable logic IC configuration data may be stored in any other suitable volatile or nonvolatile memory including, for example, static random access memory (SRAM) and dynamic random access memory (DRAM).

Data stored in memory may be associated with one or more applications. In addition to configuration data used to program the programmable logic IC, embedded data is provided for user applications (e.g., memory reads and writes specified by an application). The configuration data or embedded data may be altered such that certain binary digits are corrupted (e.g., a binary digit that was previously a binary "1" is now a binary "0," and vice versa). The present invention provides a way to detect and correct such errors.

In accordance with the invention, error correcting circuitry is used to detect and correct errors on programmable logic ICs. In one embodiment, a scrubber periodically reads all the configuration data in the programmable logic IC. The scrubber will detect and correct any errors. In another embodiment, regions of configuration data in the programmable logic IC each has dedicated error correcting circuitry that continuously operates to detect and correct any errors. In a further embodiment, hazard-free error correcting circuitry is provided.

The invention advantageously reduces the likelihood of an error affecting the programmable logic IC's operation by detecting and correcting most errors in memory on the programmable logic IC. The error correcting circuitry can quickly detect an error and output a correct value when a given memory cell is accessed. At the same time or at a later time, the correct value can be written into the memory cell. The error correcting circuitry detects and corrects errors without the use of logic external to the programmable logic IC.

Figure 1:
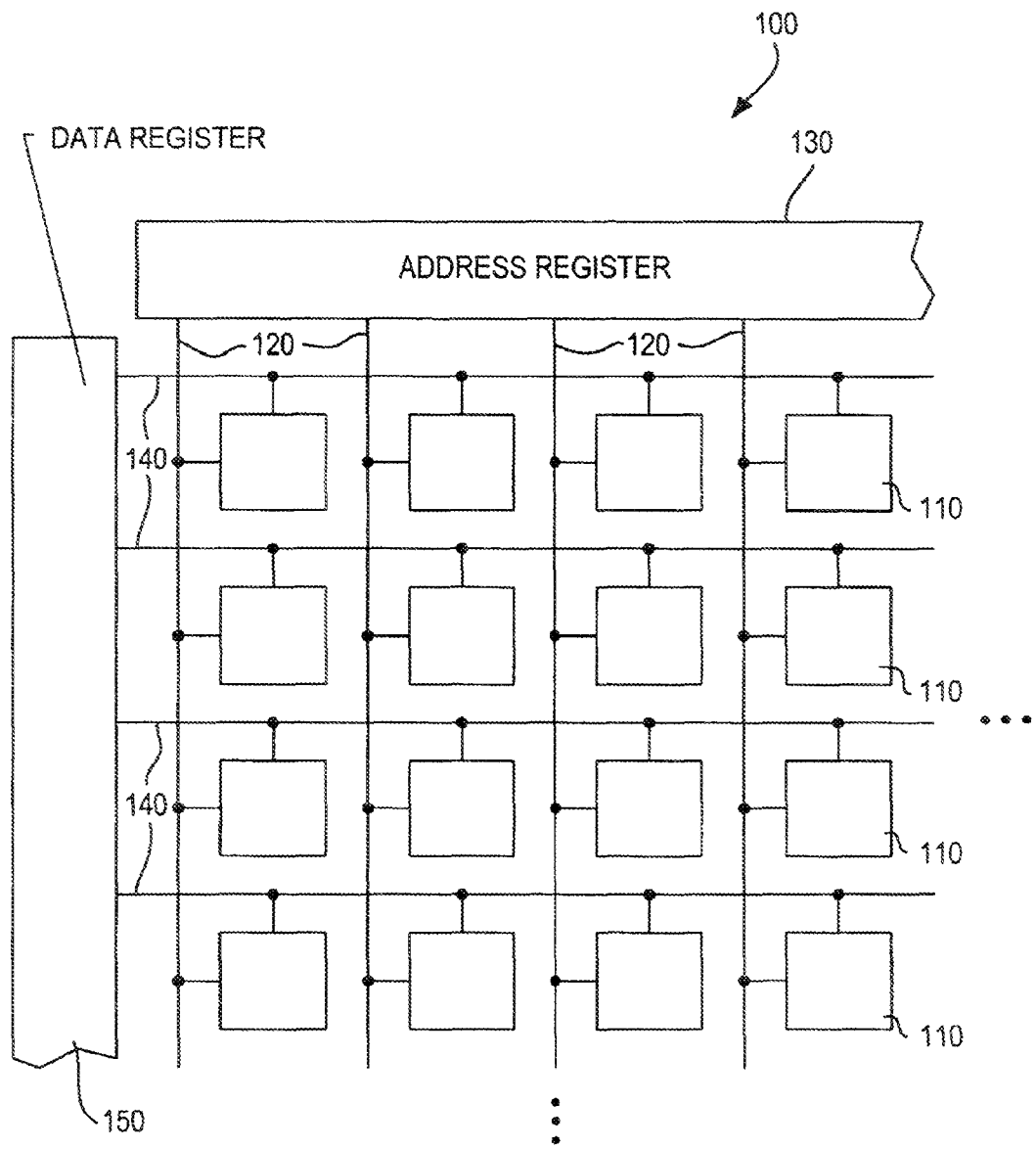
FIG. 1 is an illustrative embodiment of a memory in a programmable logic IC in accordance with the invention.

In one embodiment of the invention, error correction can be implemented using a process known as scrubbing. Scrubbing involves periodically reading the contents of memory, detecting and correcting errors in the memory, and writing the corrected contents back into the memory. FIG. 1 shows an illustrative embodiment of a memory 100 in a programmable logic IC. Memory 100 is arranged in an array of rows and columns of memory cells 110, where each memory cell 110 stores one binary digit (i.e., a binary 0 or a binary 1). Each column of memory cells 110 is coupled to an address line 120 and each row of memory cells 110 is coupled to a data line 140. An address register 130, which is coupled to each address line 120, selects a column of memory cells 110 for access (e.g., to read or to write) by driving a corresponding address line 120 to a binary "1." For a read operation, the contents of the memory cells 110 in the selected column are sensed onto corresponding data lines 140 and read by a data register 150. For a write operation, in one embodiment, data values from data register 150 are driven onto data lines 140 and written into memory cells 110 in the selected column. In another embodiment, memory cells 110 can be set to a binary "0" using a clear line and set to a binary "1" by writing data into the memory cells 110 in the selected column.

For clarity, the invention is described herein primarily in the context of memory cells being arranged in physical rows and columns. However, the memory cells can be arranged using other suitable arrangements (e.g., the memory cells can be arranged in diagonals), with each memory cell being present in one row and column.

Also for clarity, the invention is described herein primarily in the context of providing one data line coupled to each column of memory cells. However, two data lines can be coupled to each column of memory cells.

In scrubbing, the contents of memory 100 can be read periodically one frame (e.g., column) at a time. Address register 130 can be used to select an address line 120 for reading a corresponding column of memory cells 110. Address register 130 can have a number of bits equal to the number of columns, with each bit in address register 130 corresponding to one address line 120. Input signals can be used to cause a first bit location in address register 130, which can correspond to a first column, to be set to binary "1." After the first column has been read, the binary "1" can be shifted by one bit location to index a next column until each column has been read. Once the last column has been read, address register 130 can re-set the first bit location in address register 130 to binary "1" to start the process again. The process can be repeated immediately or after a predetermined time period. The columns can be accessed sequentially by physically adjacent columns or in another order.

Figure 2:
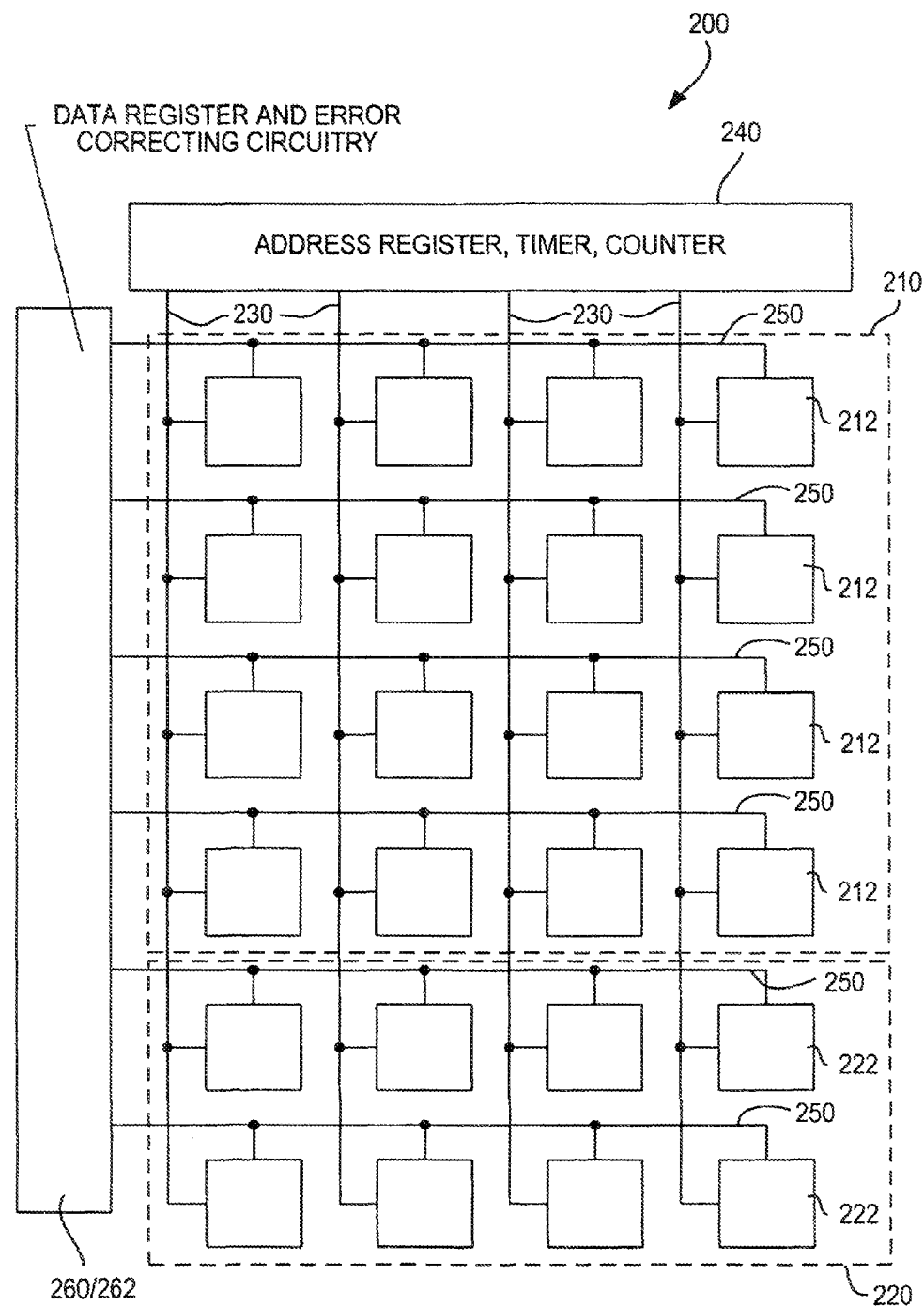
FIG. 2 is a diagram of an illustrative embodiment of a memory with error correcting circuitry in a programmable logic IC in accordance with the invention.
Figure 3A:
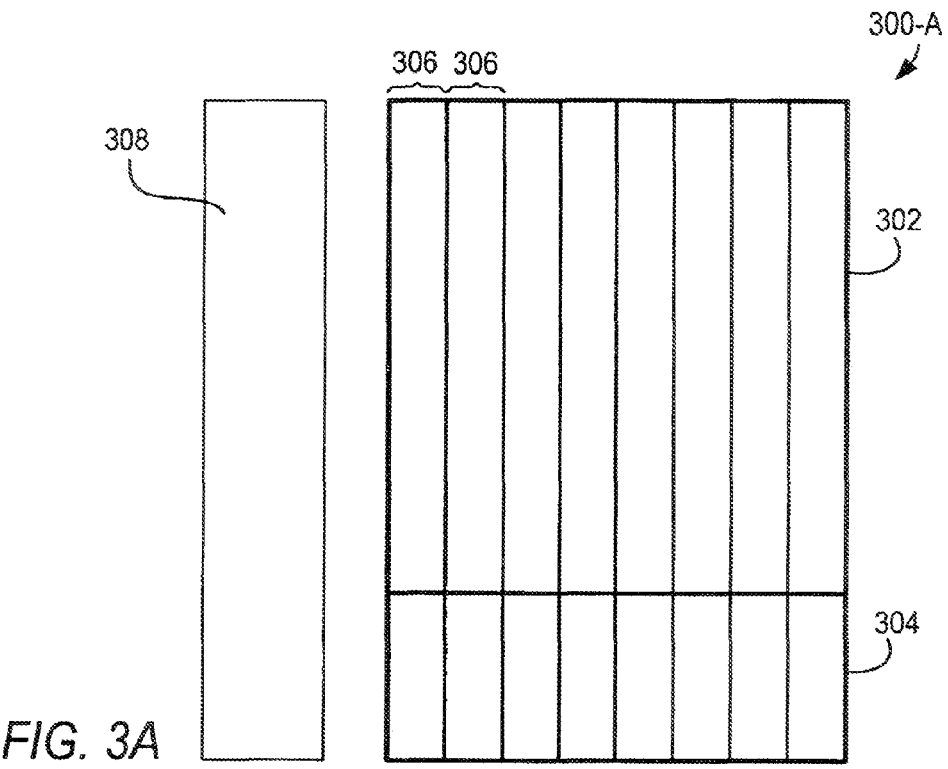
FIGS. 3A-E are diagrams of illustrative embodiments of various error correcting circuitry blocks and scrubbing regions in accordance with the invention.
Figure 3B:
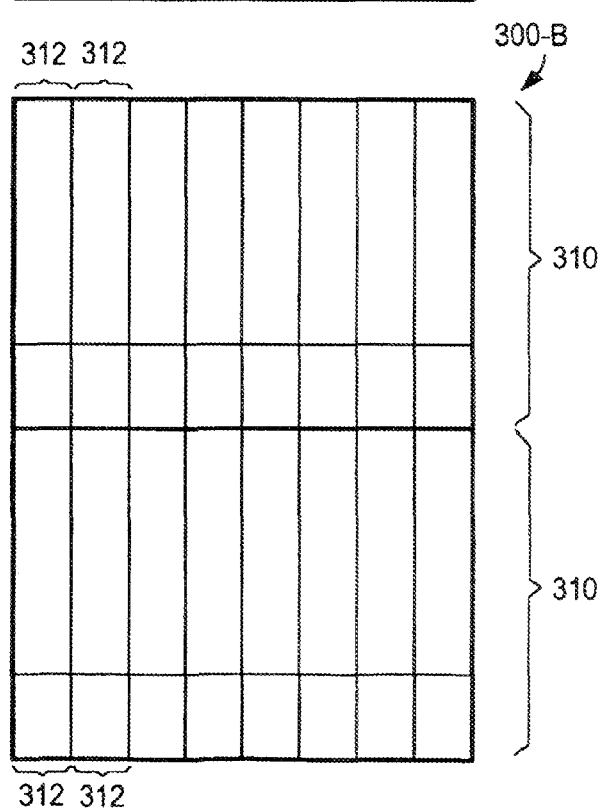
Figure 3C:
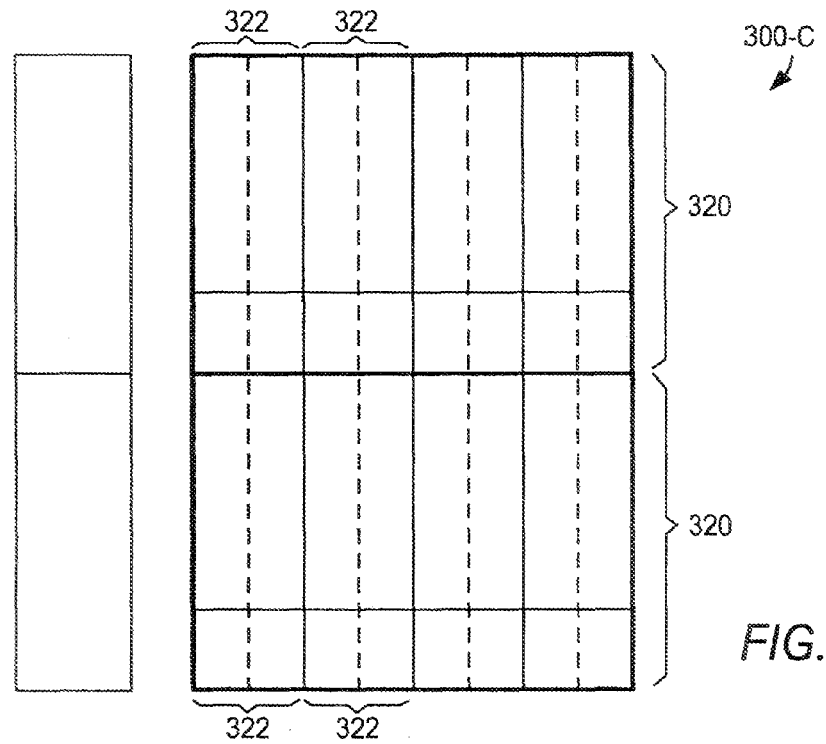
Figure 3D:
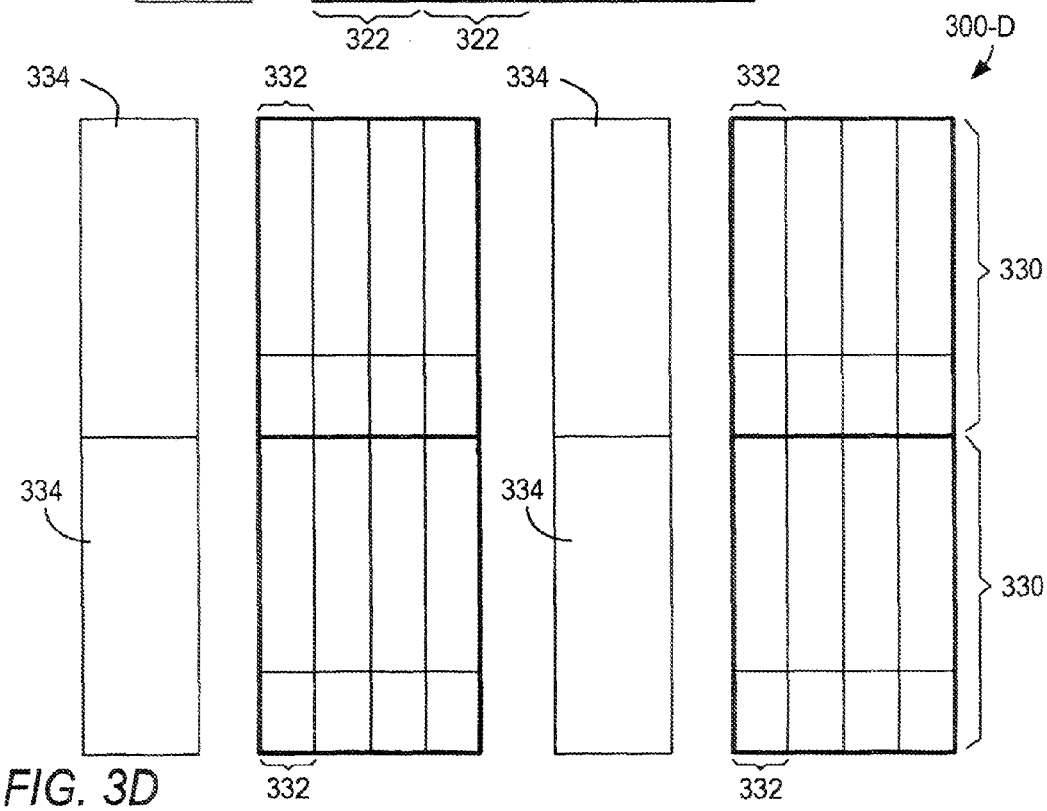
Figure 3E:
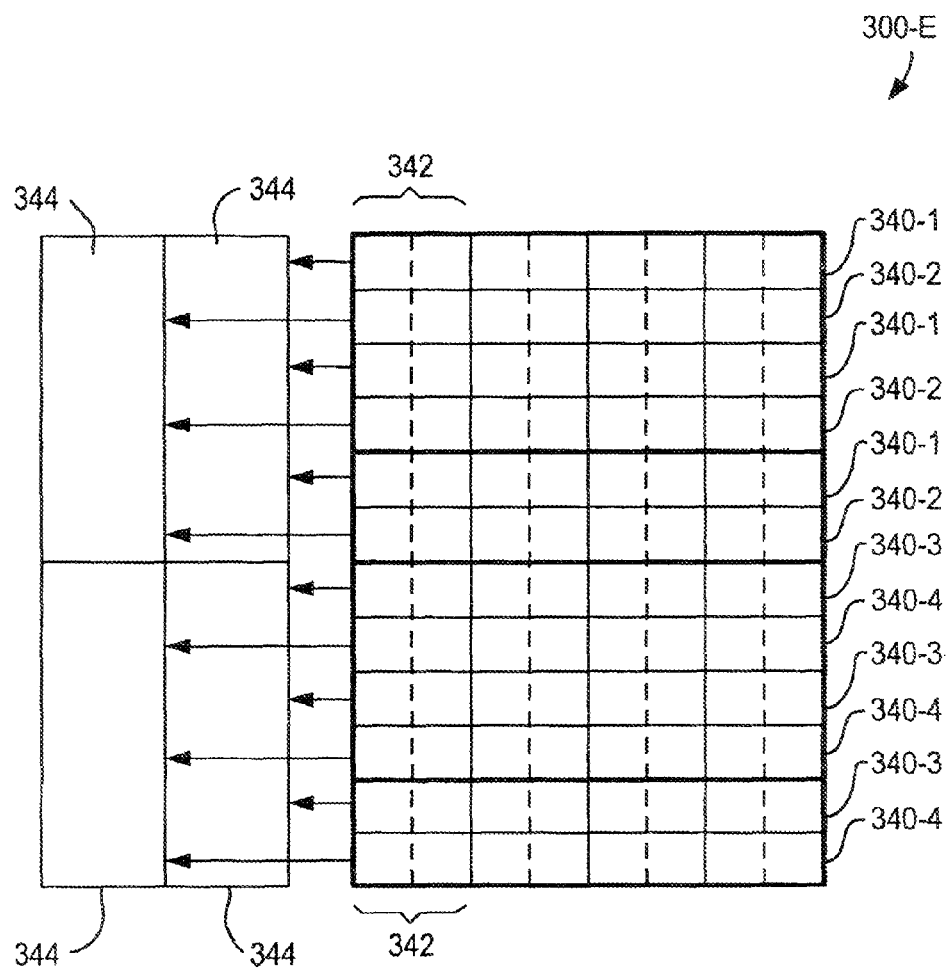

Once a column of memory cells 110 is read, the contents of those memory cells 110 are checked to determine whether an error has occurred. One approach is to store error check bits in dedicated memory cells and to implement an error correcting code on the data bits using the error check bits. As shown in FIG. 2, a memory 200 can include a block 210 of memory cells 212 that stores configuration data and a block 220 of memory cells 222 that stores error check bits. Each column of memory cells 212 in block 210 can have an associated column of memory cells 222 in block 220. Data register 260 can include additional circuitry 262 to perform error correction. The error check bits stored in memory cells 222 can be generated by error correcting circuitry 262 or alternatively, can be part of the configuration data stream used to configure the programmable logic IC. Address register 240 also includes additional circuitry to allow scrubbing to be implemented during operation of the programmable logic IC. The extra circuitry can include a timing mechanism such as an internal oscillator or a oscillator derived from an external clock. The extra circuitry can also include logic to sequence through each column of memory cells 212 and 222 in a predetermined order such that each column is accessed in a periodic manner. During each access, address register 240 asserts one address line 230, causing the contents of memory cells 212 and 222 in the selected column to be read onto data lines 250 and into data register 260.

Error correcting circuitry 262 is used to detect and correct errors in the selected column of memory cells 212 and 222. Error correcting circuitry 262 can include any suitable error correcting code such as, for example, a Hamming Code, Reed-Solomon Code, or Product Code. These error correcting codes can detect a data error in a memory cell 212 in the selected column and can correct the data error. The corrected data can be written back to the associated memory cell 212 in the selected column.

Error correcting circuitry 262 can be any suitable circuitry. For example, error correcting circuitry 262 can be a combinational circuit. The configuration data and error check bits are sent as input to the combinational circuit which generates as output the corrected configuration data and error check bits. Error correcting circuitry 262 can also be a state machine. The configuration data and error check bits are loaded into data register 260 (which can be a shift register) where the configuration data and error check bits are processed sequentially by the state machine (e.g., implementing a Hamming Code, Reed-Solomon Code, or Product Code) to generate the corrected configuration data and error check bits. The state machine can operate for several clock cycles to determine if an error has occurred, to generate the corrected data if an error has occurred, and to write back the corrected data.

Two design aspects that determine the cost and performance of error correcting circuitry (ECC) are the size of an ECC block and a scrubbing region. The ECC block includes the block of memory cells (which store the configuration data and error check bits) that are processed by the error correcting circuitry at a given time. The ECC block can include a single column or more than one column (e.g., 2, 3, 4) of the programmable logic IC. The ECC block can span an entire height or a portion of the entire height (e.g., one-quarter, one-third, one-half, three-quarters, or other fraction) of the programmable logic IC. The memory cells in the ECC block can be physically contiguous or non-contiguous (e.g., the memory cells for different ECC blocks can be interleaved across a number of rows and columns).

The size of the ECC block can be determined by a number of factors including, for example, the time required for the error correcting circuitry to detect and correct errors, the number of memory cells required to store the error check bits, the complexity of the error correcting circuitry, and the rate of errors occurring in the programmable logic IC. There can be a trade-off between the number of error check bits required for the ECC block and the complexity of the error correcting circuitry. A larger ECC block will require more error check bits and thus more error correcting logic, but the proportion of error check bits to configuration bits will be proportionally smaller. For example, an ECC block of 100 bits may require 20 check bits (providing a 20% overhead) while an ECC block of 400 bits may require 40 check bits (providing only a 10% overhead). However, the error correcting logic for the 400-bit ECC block may require more than four times the area of the error correcting logic for the 100-bit ECC block. In addition, as the size of the ECC block increases, the cost per bit increases such that the cost per bit for the 400-bit ECC block is higher than the cost per bit of the 100-bit ECC block. As a result, the ECC block size is designed to achieve a lowest overall cost by balancing the number of check bits with the ECC logic.

The scrubbing region refers to the block of memory cells (that store the configuration data and error check bits) that are covered by a single error correcting circuit. There can be one scrubbing region that includes all of the configuration data. Alternatively, there can be more than one scrubbing region that includes a portion (e.g., one-quarter, one-third, one-half, three-quarters, or other fraction) of the configuration data.

The scrubbing speed can be determined by a number of factors including, for example, the size of the scrubbing region, the time needed to read from and write to the memory cells, address line drive time, resistance of the address lines and data lines, maximum clocking speed, the delay of the error correcting circuitry, and power dissipation. As the size of the scrubbing region increases, errors remain in the memory cells longer because of the time required to scrub the memory cells. Long data lines can cause delays in reading data from and writing data to a memory cell and can also result in an increase in power dissipation. In addition, processing the data in the error correcting circuitry can require many clock cycles because of the potentially large number of ECC blocks.

The scrubbing speed can be increased by dividing the programmable logic IC into smaller scrubbing regions, with each scrubbing region having dedicated error correcting circuitry. A smaller number of clock cycles are needed to process the data in the error correcting circuitry. This also results in shorter data lines that reduce the delay and power dissipation. For example, because most memory cells in a programmable logic IC are set to a binary "0" for typical applications, the sensing of the memory cells can be designed such that no voltage change on the data line is required to sense a binary "0," thus reducing the power dissipation. The scrubbing speed can further be increased by dividing the data lines for each scrubbing region into two lines and placing sensing logic and error correcting circuitry in the center. This reduces the time for data from the memory cells that are furthest from the error correcting circuitry to be transmitted to the error correcting circuitry. To further reduce power dissipation, the data lines for each scrubbing region can be segmented into multiple lines.

When more than one scrubbing region is provided, more than one ECC block can be read and processed simultaneously in respective error correcting circuitry. Alternatively, more than one ECC block can share the same error correcting circuitry by using multiplexers between the different scrubbing regions and the error correction circuitry, effectively making them part of the same scrubbing region.

FIGS. 3A-E show different embodiments of a memory array 300 that implements a scrubber. Memory array 300-A (FIG. 3A) illustrates one scrubbing region that occupies an entire programmable logic IC. The scrubbing region includes an array of memory cells for configuration data 302 and check bits 304 and a data register with error correcting circuitry 308. The scrubbing region includes multiple ECC blocks 306 that are each one column wide and span the entire height of the programmable logic IC.

Memory array 300-B (FIG. 3B) illustrates two scrubbing regions 310. Each scrubbing region 310 spans the entire width and half the height of the programmable logic IC. Each scrubbing region 310 has a separate data register with error correcting circuitry 314. Each scrubbing region 310 includes multiple ECC blocks 312 that are each one column wide and span half the height of the programmable logic IC.

Memory array 300-C (FIG. 3C) also illustrates two scrubbing regions 320. Each scrubbing region 320 includes multiple ECC blocks 322 that are each two columns wide and span half the height of the programmable logic IC.

Memory array 300-D (FIG. 3D) illustrates four scrubbing regions 330. Each scrubbing region 330 spans half the width and half the height of the programmable logic IC. Each scrubbing region 330 has a separate data register with error correcting circuitry 334. Each scrubbing region 330 includes multiple ECC blocks 332 that are each one column wide and span half the height of the programmable logic IC.

Memory array 300-E (FIG. 3E) illustrates four scrubbing regions 340 (e.g., 340-1, 340-2, 340-3, 340-4). Two scrubbing regions (e.g., 340-1 and 340-2; and 340-3 and 340-4) are interleaved in each half of the programmable logic IC such that the memory cells are physically non-contiguous (e.g., every other row of memory cells are part of the same scrubbing region). Each scrubbing region 340 spans the entire width and one-quarter the height of the programmable logic IC. Each scrubbing region 340 has a separate data register with error correcting circuitry 344. Each scrubbing region 340 includes multiple ECC blocks 342 that are each two columns wide and span one-quarter the height of the programmable logic IC.

Memory arrays 300A-E are merely illustrative and described herein for clarity. However, the invention may be implemented using other numbers and arrangements of scrubbing regions and ECC blocks.

In another embodiment of the invention, the time in which an error is detected and corrected can be reduced by providing error correcting circuitry for some or all of the memory cells in a programmable logic IC. The error correcting circuitry can be continuously operative so that errors are corrected substantially as soon as they occur.

In this embodiment, memory cells in the programmable logic IC are divided into one or more ECC regions. Each ECC region includes a set of memory cells and dedicated error correcting circuitry that corrects errors that may occur in one or more memory cells. The memory cells of each ECC region are directly connected to the inputs of error correcting circuitry with the outputs directly driving the control point of the programmable logic IC (i.e., the outputs of the error correcting circuitry are driven onto corresponding data lines).

The dedicated error correcting circuitry generates the correct value for a given memory cell. Since the error correcting circuitry does not physically change the contents of a given memory cell, other circuitry, such as a scrubber described above, can be used in conjunction with the dedicated error correcting circuitry to write the correct value into the given memory cell. The ECC regions may be the same as the scrubbing regions, in which case these regions may share the same error check bits. Alternatively, the ECC regions may be different from the scrubbing regions, in which case each region may require different error check bits.

Each memory cell can be designed to have a small amount of associated logic that determines whether an error has occurred and generates the correct output if an error is detected. The associated logic forms an error correcting cell that can be replicated across the programmable logic IC to be associated with each memory cell. An extra column and row of memory cells (e.g., parity cells) can be added to the programmable logic IC which stores a parity bit for the associated column or row. For even parity, the binary digit stored in the extra memory cell is the binary digit that makes the exclusive OR (XOR) of all the memory cells in that column or row a binary "0." For odd parity, the binary digit stored in the extra memory cell is the binary digit that makes the XOR of all the memory cells in that column or row a binary "1."

A horizontal parity generator and a vertical parity generator can be used to detect errors that occur in a memory cell. Each error correcting cell XORs the data from a memory cell with the incoming horizontal and vertical parity lines and sends the result onto outgoing horizontal and vertical parity lines. A resulting horizontal parity for a row of memory cells and a resulting vertical parity for a column of memory cells are used to determine whether an error has occurred in the memory cell in the row and column. If an error has occurred (e.g., if the horizontal parity and the vertical parity are both binary "1"), the error correcting cell complements the data from the memory cell to generate the correct value at the output.

A reasonable number of error correcting cells may be cascaded to form an array of a suitable size. A first input to the parity generator may be tied to ground (e.g., binary "0") and the last output may be the resulting parity that is used to detect the occurrence of an error. If the ECC regions are small, it may be desirable to customize the error correcting cell at the ends of the array to eliminate unused logic (e.g., the XOR gate in the first cell that has an input tied to ground can therefore be replaced with a wire).

Figure 4:
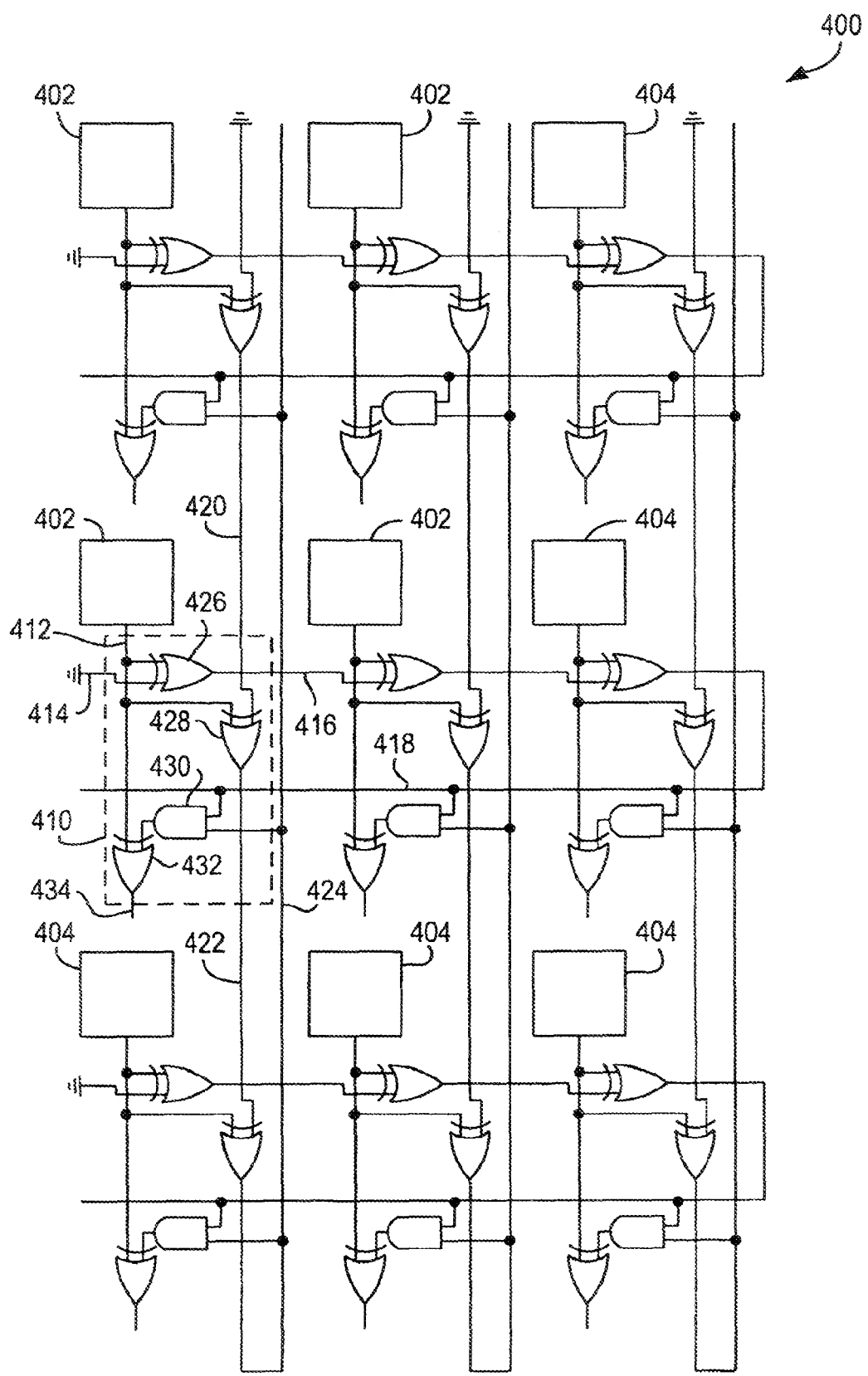
FIG. 4 is a diagram of an illustrative embodiment of dedicated error correcting circuitry in accordance with the invention.

An illustration of error correcting circuitry 400 is shown in FIG. 4. For clarity, circuitry 400 is described in the context of a 2×2 array of memory cells 402 with an extra row and column of parity cells 404. However, the invention can be implemented using other array sizes of memory cells 402. Each memory cell 402 and parity cell 404 has an associated error correcting cell 410 that detects and corrects a data error.

The contents of a memory cell 402 or parity cell 404 are sent as input 412 to an associated error correcting cell 410. Each cell 410 also has two incoming horizontal parity lines 414 and 418, one outgoing horizontal parity line 416, two incoming vertical parity lines 420 and 424, one outgoing vertical parity line 422, and an output 434 that generates the correct value for the associated memory cell 402 or parity cell 404. For the leftmost column of cells 402 and 404, incoming horizontal parity line 414 is tied to ground (i.e., set to binary "0"). Except for the rightmost cell 410 in each row, outgoing horizontal parity line 416 serves as incoming horizontal parity line 414 for adjacent cell 410. For the rightmost cell 410 in each row, outgoing horizontal parity line 416, which contains the computed parity of the row, serves as incoming horizontal parity line 418 for each cell 410 in the given row that is used to determine whether an error has occurred in that row. For the topmost column of cells 402 and 404, incoming vertical parity line 420 is tied to ground (i.e., set to binary "0"). Except for the bottommost cell 410 in each column, outgoing vertical parity line 422 serves as incoming vertical parity line 420 for adjacent cell 410. For the bottommost cell 410 in each column, the outgoing vertical parity line, which contains the computed parity of the column, serves as incoming vertical parity line 424 for each cell 410 in the given column that is used to determine whether an error has occurred in that column.

Each cell 410 includes three XOR gates 426, 428, and 432, and an AND gate 430. XOR gate 426 has as inputs data 412 (e.g., from memory cell 402 or parity cell 404) and incoming horizontal parity line 414, and outputs data on outgoing horizontal parity line 416. XOR gate 428 has as inputs data 412 and incoming vertical parity line 420, and outputs data on outgoing vertical parity line 422. The computed horizontal parity, which is sent on incoming horizontal parity line 418, and the computed vertical parity, which is sent on incoming vertical parity line 424, are input to AND gate 430. Data 412 and the output of AND gate 430 are input to XOR gate 432 which sends as output 434 the correct output bit. Output 434 may be coupled to data lines (e.g., lines 250) so that the data can be sent to the data register.

Static hazards may occur during the operation of the programmable logic IC. A static hazard is a property of a circuit in which a change in logic value of one input causes a momentarily incorrect value (e.g., a glitch) on one of its outputs. This can be attributed to the difference in propagation time for the inputs to XOR gate 432. One input, data 412, comes directly from memory cell 402 or 404. The other input requires the horizontal parity and vertical parity to be generated and propagated to AND gate 430. If data from one memory cell changes, the change will be rapidly propagated to XOR gate 432, causing a transition to an incorrect value at output 434. Some time later, once the horizontal parity and vertical parity are generated, a second transition back to the correct value will occur at output 434.

In yet another embodiment, error correcting circuitry can further be designed to reduce static hazards while limiting the amount of logic required to implement such error correcting circuitry. In an alternative embodiment to FIG. 4 where the implementation of a horizontal parity and a vertical parity creates reconvergent paths from the memory cell to the output, error correcting circuitry can be designed to avoid these reconvergent paths and thus reduce such hazards. A separate horizontal parity generator and vertical parity generator can be designed that compute the parity for all the memory cells in that row and column except for the particular memory cell being corrected. The correct value is then computed based on the horizontal parity, vertical parity, and the data from the particular memory cell.

While this approach advantageously provides for hazard-free error correcting circuitry, each memory cell requires additional logic for generating the parity of all the memory cells in a row or column except for the particular memory cell. For example, if there are N memory cells in a row or column, the parity for all the memory cells can be generated using (N−1) XOR gates. It is possible to generate the parity of each one of a possible set of N memory cells by using a total of (3*N−6) XOR gates. A first set of logic levels can generate the parity of each possible set of $2^K$ inputs for a subset of values of $2^K$ that are aligned with that particular power of 2 up to N/2. Subsequent logic stages can generate the parity of each possible set of (N—1) of the inputs. In addition, a 10-transistor complex gate (e.g., OR-AND-OR gate or OR-AND-OR-INVERT gate) is needed to correct the data.

Figure 5:
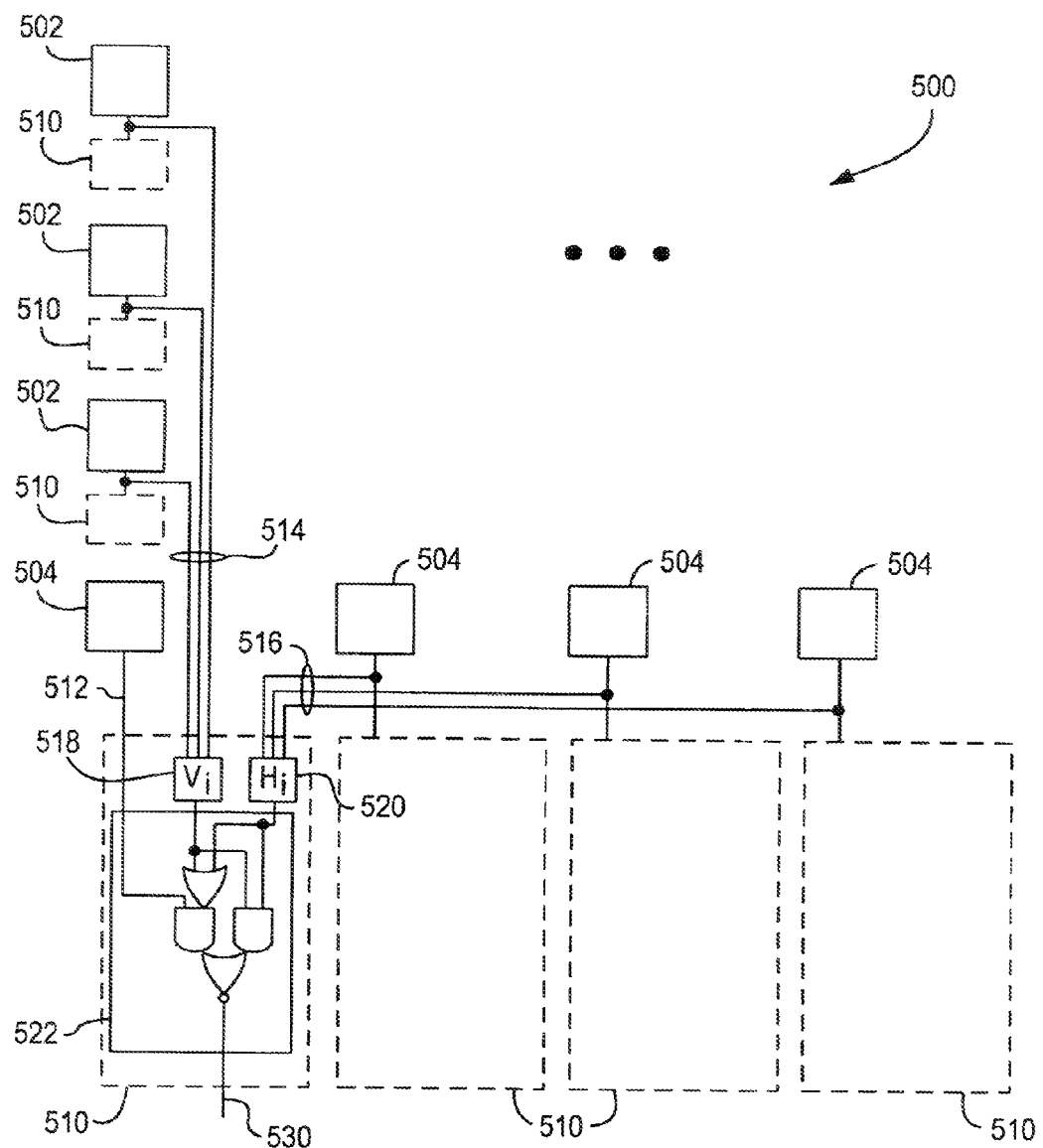
FIGS. 5-8C are diagrams of illustrative embodiments of hazard-free error correcting circuitry in accordance with the invention.

An illustration of such hazard-free error correcting circuitry 500 is shown in FIG. 5. For clarity, circuitry 500 is described in the context of a 3×3 array of memory cells 502 with an extra row and column of parity cells 504, although the invention can be implemented using other array sizes of memory cells 502. Each memory cell 502 and parity cell 504 has an associated error correcting cell 510 that detects and corrects a bit error.

The contents of a particular memory cell 502 or parity cell 504 are sent as input 512 to an associated error correcting cell 510. Each cell 510 also receives as input data 514 from the contents of the other cells 502 and/or 504 in the same column and data 516 from the contents of the other cells 502 and/or 504 in the same row. Data 514 is sent as input to circuitry 518 that generates the vertical parity (Vi) for the other cells 502 and/or 504 in that column. Data 516 is sent as input to circuitry 520 that generates the horizontal parity (Hi) for the other cells 502 and/or 504 in that row.

Although each cell 510 is shown as having separate circuitry 518 and 520, the memory cells 502 and parity cell(s) 504 in each column and row can share circuitry to compute the vertical and horizontal parity. The outputs of circuitry 518 and 520 are sent as input to a complex logic gate 522. Complex logic gate 522 can be an OR-AND-OR gate. Alternatively, using a less expensive approach, complex logic gate 522 can be an OR-AND-OR-INVERT gate in which the complement of the data is stored in cells 502 and 504. Complex logic gate 522 generates a correct value for the particular memory cell 502 or parity cell 504 at output 530. The logic for circuitry 500 is shown by the following:

$$Z = \text{NOT}((Hi \text{ AND } Vi) \text{ OR} (C \text{ AND}(Hi \text{ OR } Vi))) \quad (1)$$

Where Z=Output 530
C=Data 512
Hi=Horizontal parity from 520
Vi=Vertical parity from 518.

Figure 6:
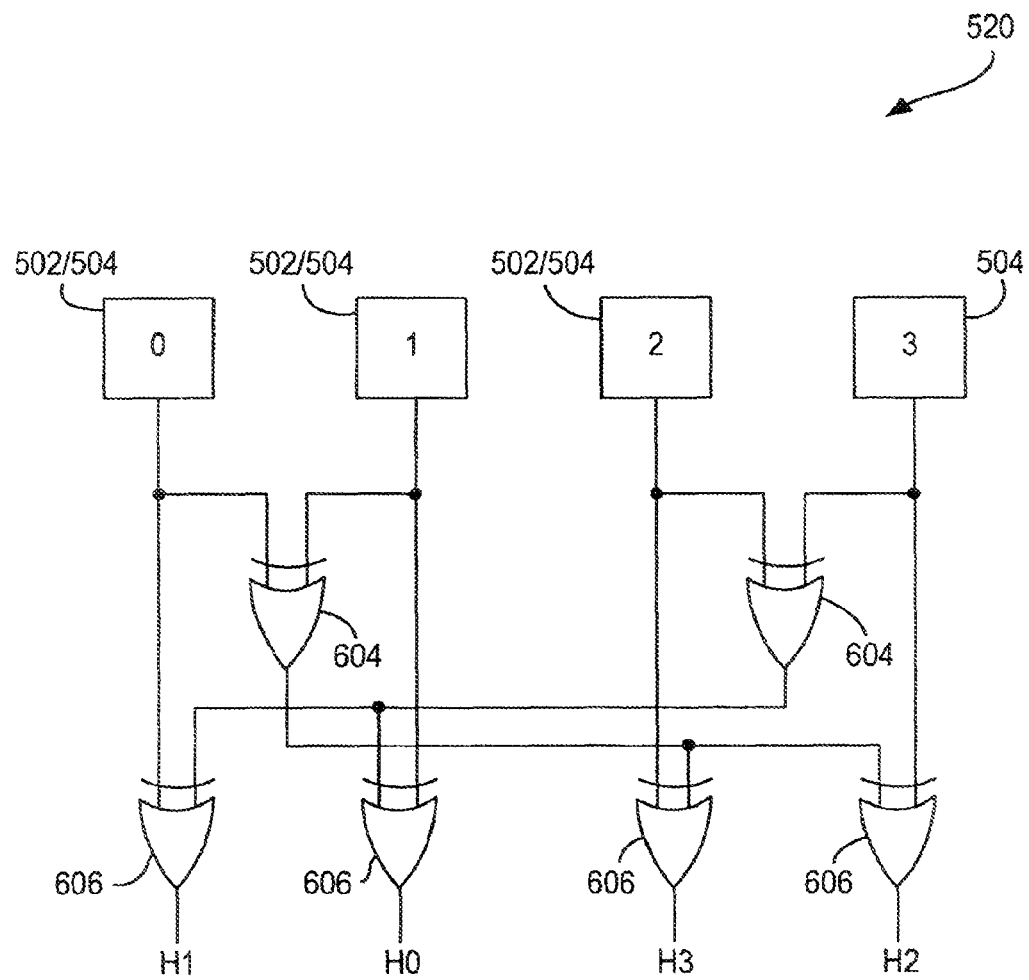

Circuitry 518 and 520 can be implemented using XOR gates. FIG. 6 shows an embodiment of circuitry 520 that computes the horizontal parity bit H0, H1, H2, and H3 for all the cells 502 and/or 504 in the row except for the particular cell 502 or 504 being corrected. In a first logic level, XOR gates 604 are used to generate the parity for two pairs of cells 502 and/or 504 (e.g., cell pairs 0 and 1 and cell pairs 2 and 3). In a second logic level, XOR gates 606 are used to generate the parity for one of the pairs of cells and another cell that is not the particular cell being corrected. For example, output H0 is the parity of memory cells 1, 2, and 3; output H1 is the parity of memory cells 0, 2, and 3; output H2 is the parity of memory cells 0, 1, and 2; and output H3 is the parity of memory cells 0, 1, and 2. Thus it can be seen that a total of 6 (i.e., 3*N−6, where N is 4) XOR gates are used. A vertical parity bit can also be generated using similar logic levels.

Hazard-free error correcting circuitry can also be implemented using the triple redundancy method which may require less logic gates and is thus less expensive to implement than the approach described in connection with FIGS. 5 and 6. In the triple redundancy method, each configuration bit is programmed into three memory cells, which can be physically contiguous or physically non-contiguous. A hazard-free voting circuit includes a complex logic gate that compares the data stored in the three memory cells. The output of the circuitry is the same bit value stored in at least two of the memory cells. This circuitry produces a correct output when only one memory cell has an error. If more than one memory cell in the group of three memory cells has an error, an incorrect output will be generated.

Figure 7:
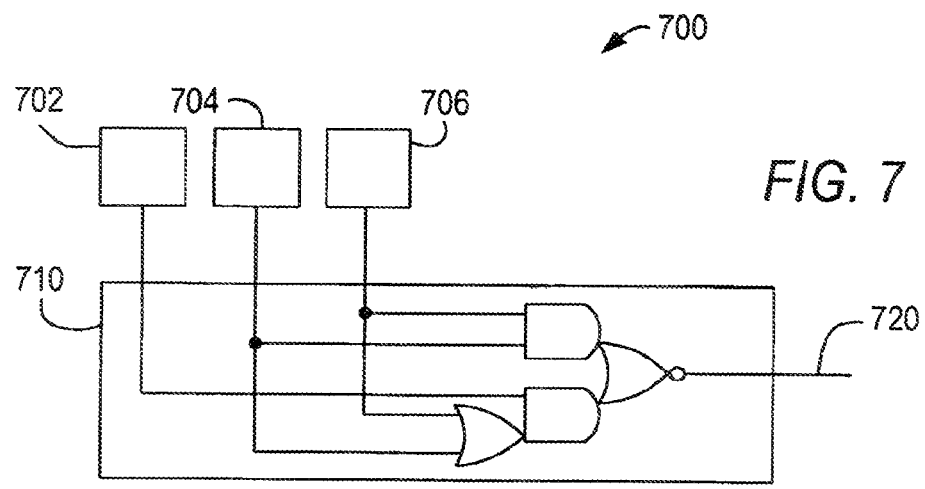

An illustration of hazard-free error correcting circuitry 700 using the triple redundancy method is shown in FIG. 7. A configuration data bit is stored in three memory cells 702, 704, and 706. Data from memory cells 702, 704, and 706 are sent as input to a complex logic gate 710. Complex logic gate 710 can be an OR-AND-OR gate. Alternatively, using a less expensive approach, complex logic gate 710 can be an OR-AND-OR-INVERT gate in which the complement of the data is stored in cells 702, 704, and 706. Thus, if a binary "0" is stored in all three memory cells 702, 704, and 706, the output will be binary "1," while if a binary "1" is stored in all three memory cells 702, 704, and 706, the output will be binary "0." Complex logic gate 710 generates a correct value for the memory cells 702, 704, and 706 at output 720. As an illustration, if a binary "0" is stored in each of memory cells 702, 704, and 706 but an error occurs that causes the contents of one of memory cells 702, 704, or 706 to change to a binary "1," output 720 will still be a binary "1." Similarly, if a binary "1" is stored in each of memory cells 702, 704, and 706 but an error occurs that causes the contents of one of memory cells 702, 704, or 706 to change to a binary "0," output 720 will be a binary "0." In the case of a non-inverting OR-AND-OR gate, the output of the gate would be the same value as the three memory cells 702, 704, and 706, not the complement as described above.

A further approach to reduce costs in implementing error correcting circuitry is to make a logic stage of the error correcting circuitry so slow that any potential glitch is absorbed by the logic. For example, a logic gate with a weak drive, together with a large capacitive load, can be added to the output of the error correcting circuitry. The logic gate may be weakened by using narrow and long transistors or by adding a resistive element at the output. The resistive element may be polysilicon wire, another high resistivity circuit structure, a current starved pass gate with both gates turned on at slightly above the threshold voltage, or a current starved inverter.

Figure 8A:
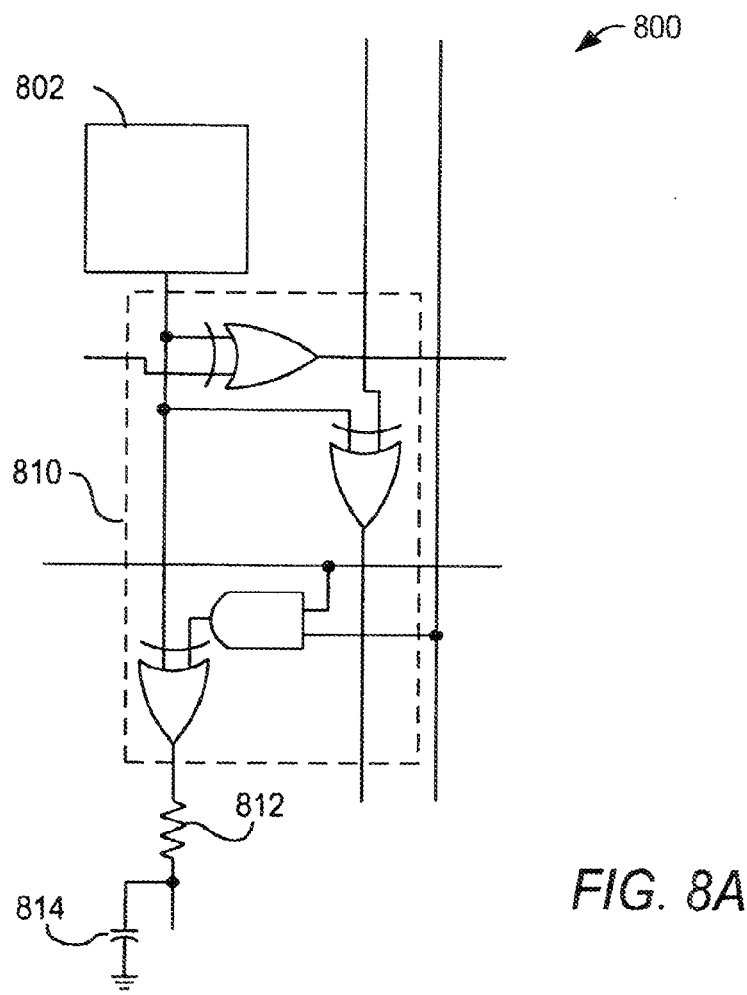
Figure 8B:
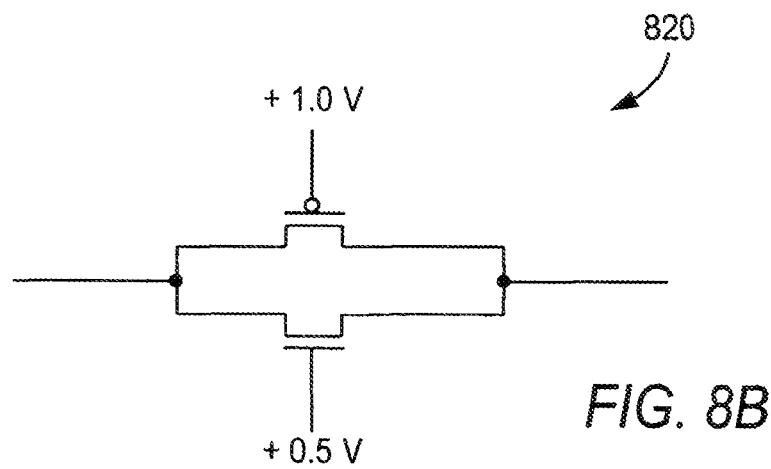
Figure 8C:
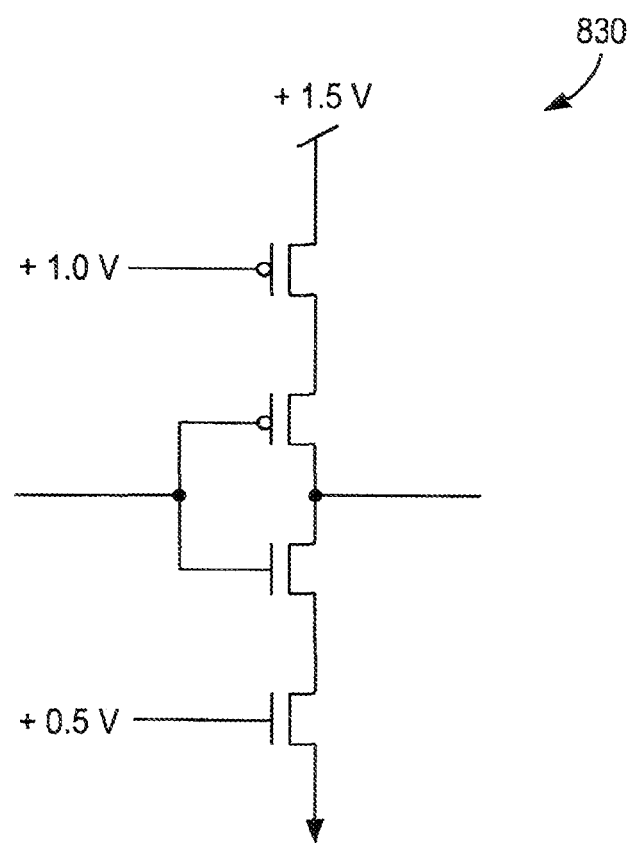

An illustration of such circuitry 800 is shown in FIGS. 8A-C. Data from a memory cell or parity cell 802 is sent to a cell 810 containing error correcting circuitry (e.g., cell 410 or 510). The output of cell 810 can be sent to a resistive element such as a resistor 812 (FIG. 8A), a current starved pass gate 820 (FIG. 8B), a current starved inverter 830 (FIG. 8C), or other resistive element, together with a capacitive load 814, increases the delay time. The output of the resistive element has the correct value for output onto a data line.

Figure 9A:
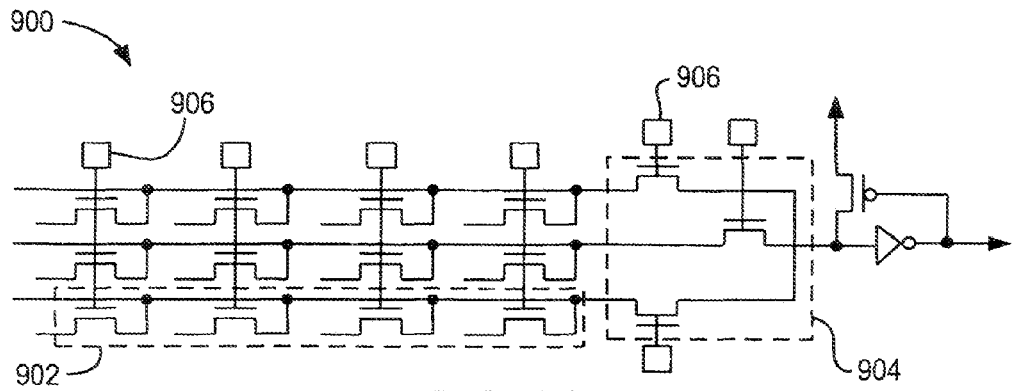
FIGS. 9A-C are diagrams of illustrative embodiments of multiplexers implemented using a programmable logic IC architecture with error correcting circuitry in accordance with the invention.

Because error correcting circuitry results in an increase in the cost of memory cells, it is more desirable to design programmable logic IC routing architectures that reduce the number of memory cells needed to implement a given function. FIG. 9A is a diagram of a 12:1 multiplexer 900 commonly used in programmable logic IC routing architectures. Multiplexer 900 can be constructed as a two-stage random access memory (RAM) sharing multiplexer. The first stage includes three 4:1 multiplexers 902. The second stage includes one 3:1 multiplexer 904. Seven memory cells 906 are needed to configure multiplexer 900.

Figure 9B:
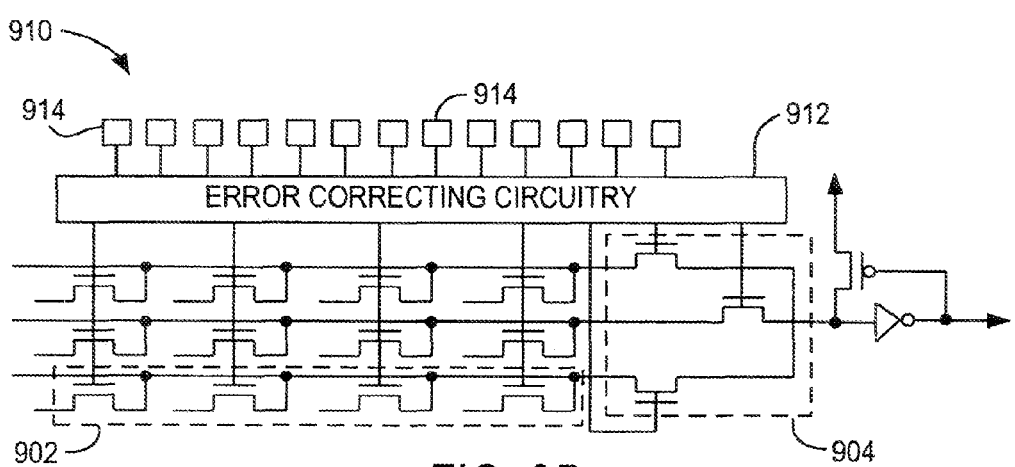

FIG. 9B is a diagram of a 12:1 multiplexer 910 with error correcting circuitry 912. Additional memory cells 914 are needed to store error check bits for performing error correction.

Figure 9C:
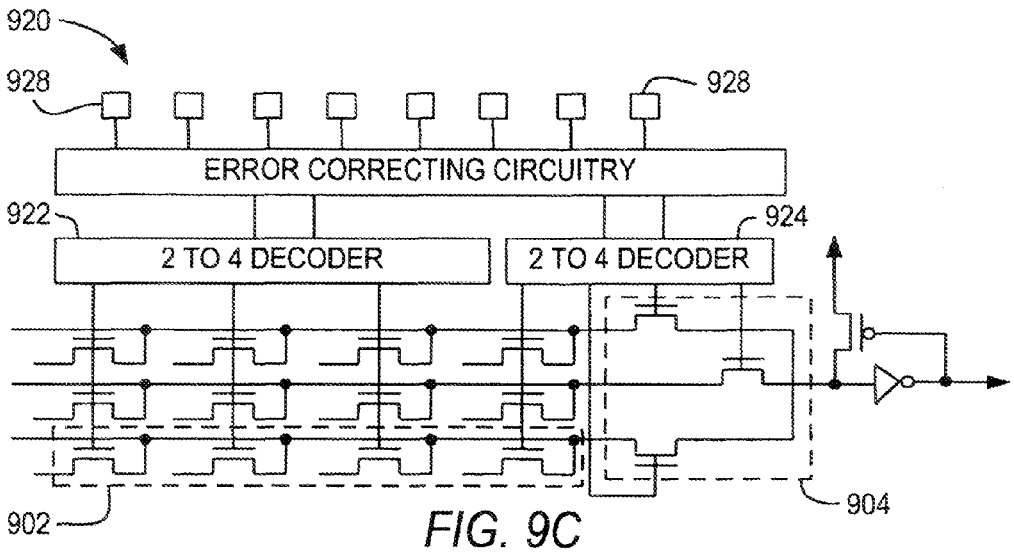

FIG. 9C is a diagram of a fully encoded 12:1 multiplexer 920. Multiplexer 920 requires two 2:4 decoders 922 and 924: one for interfacing the three 4:1 multiplexers 902 with error correcting circuitry 926, and one for interfacing the 3:1 multiplexer 904 with error correcting circuitry 926. Because of the use of decoders 922 and 924, fewer memory cells 928 are needed to control the operation of multiplexer 920. A fully encoded multiplexer 920 is more efficient when error correcting circuitry 926 is included.

In addition to providing error correction in a configuration memory in a programmable logic IC, error correcting circuitry can also be provided to correct errors occurring in embedded memory blocks (EMBs) in a programmable logic IC. To reduce the likelihood of errors affecting the data read from an EMB, error correcting circuitry can be included in the input and output interface circuitry.

Figure 10:
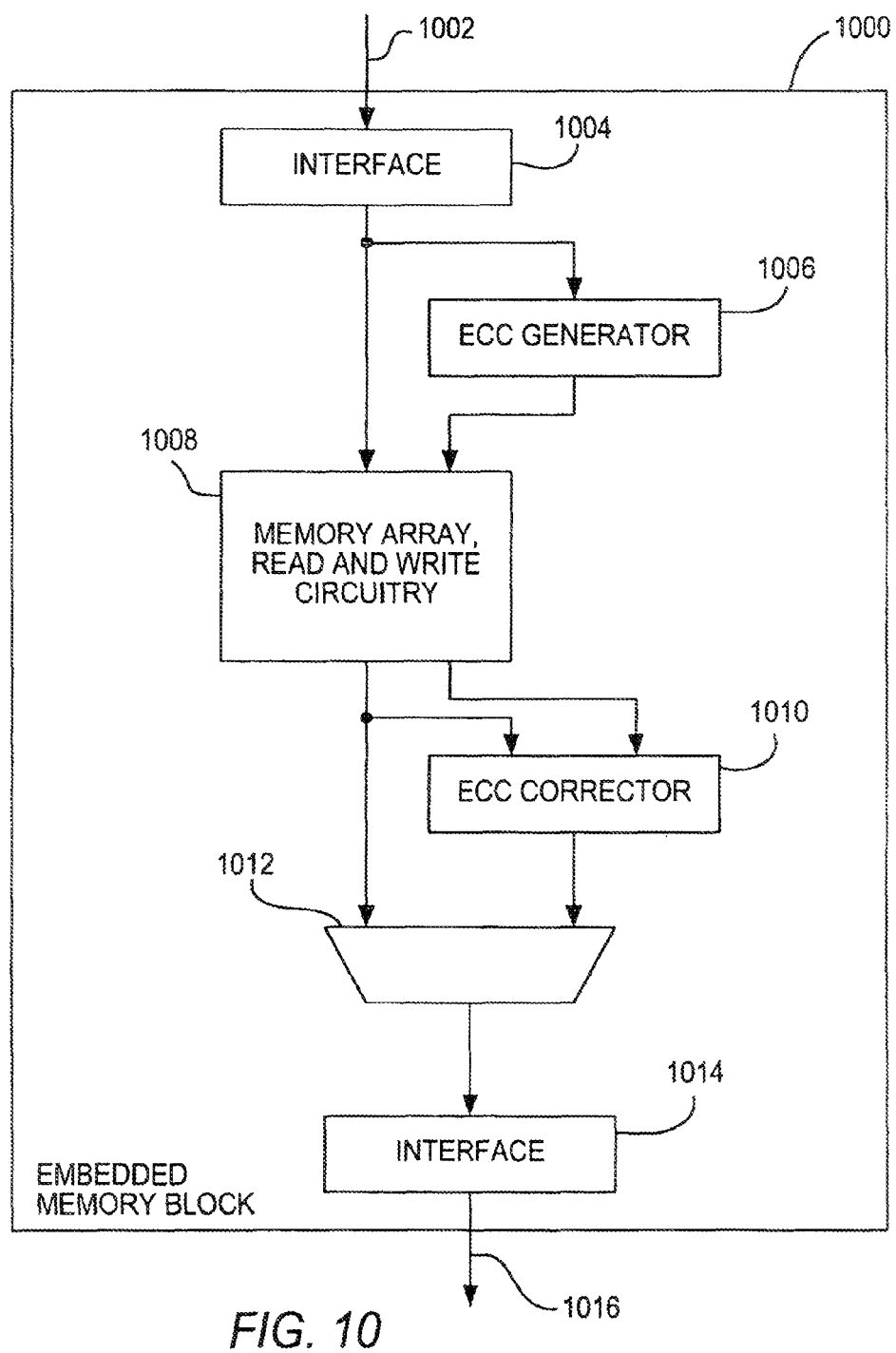
FIGS. 10-11 are diagrams of illustrative embodiments of embedded memory blocks with error correcting circuitry in accordance with the invention.

FIG. 10 illustrates one embodiment of an EMB 1000 with error correcting circuitry implemented in hardware. Input data 1002 is sent to an interface 1004 in EMB 1000. Data from interface 1004 is sent to a memory array, read and write circuitry 1008 and an ECC generator 1006. ECC generator 1006 on the input (i.e., write) circuitry of the EMB computes error check bits for the input data. For example, for N data bits, M error check bits may be required (e.g., with M≧log (N+M+1)). The error check bits are sent as input to memory array, read and write circuitry 1008 where the error check bits are stored. Data from memory array, read and write circuitry 1008 is sent as input to a multiplexer 1012 and an ECC corrector 1010. ECC corrector on the output (i.e., read) circuitry of EMB 1000 determines whether an error has occurred in the data based on the error check bits and corrects any errors before sending the data to multiplexer 1012. ECC corrector 1010 can include any suitable error correcting code including, for example, a Hamming Code, Reed-Solomon Code, and Product Code. Multiplexer 1012 selects one of the inputs for output to interface 1014. Data 1016 is then output from EMB 1000.

Since not all users of a programmable logic IC may require error correcting circuitry, it may be desirable to allow the ECC hardware (e.g., ECC generator 1006 and ECC corrector 1010) to be bypassed, allowing a user to use all the EMB bits as data bits rather than dedicating a portion of the EMB bits as error check bits. This also allows users to avoid any extra delay or latency in accessing EMB 1000 because of the ECC hardware.

Figure 11:
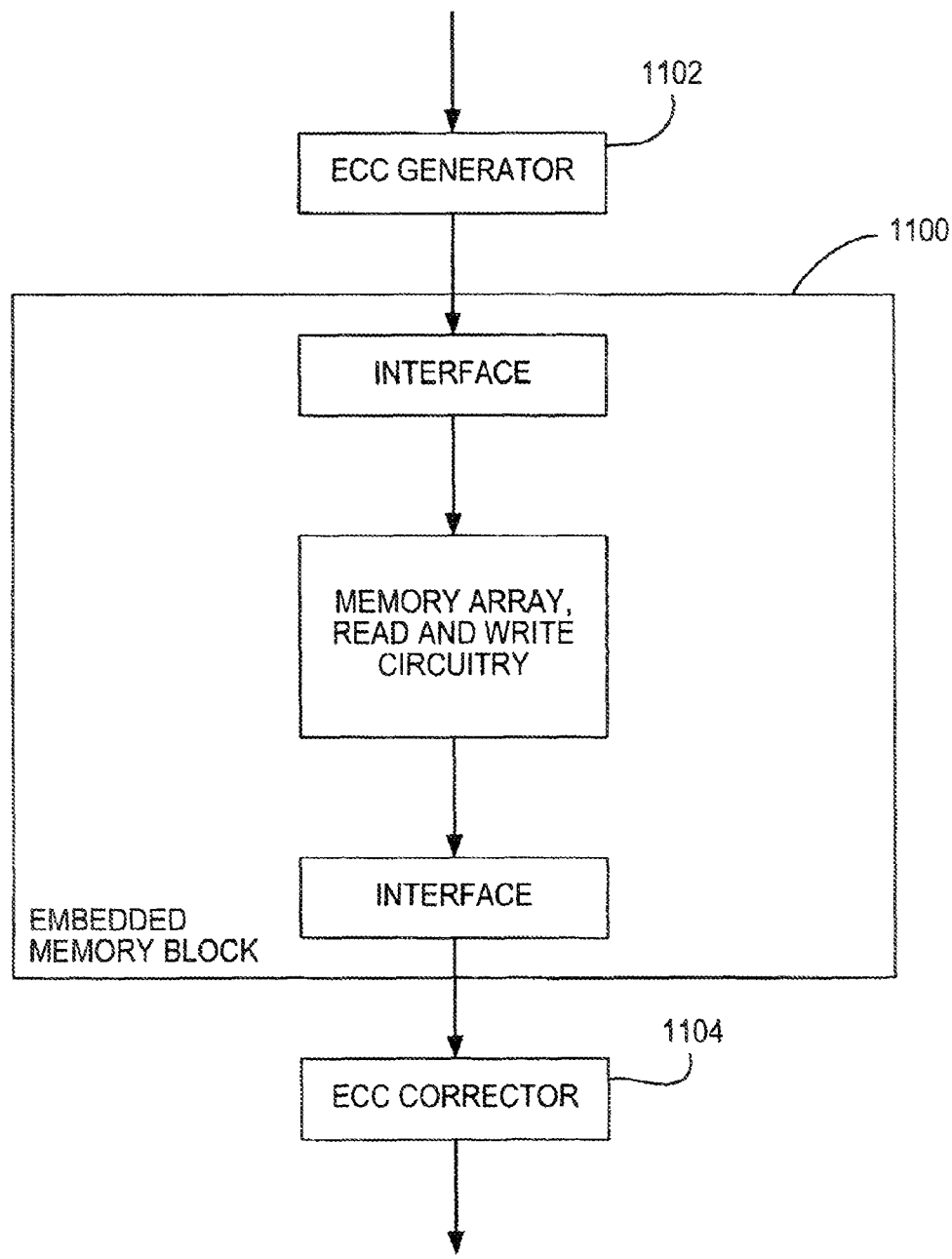

FIG. 11 illustrates another embodiment of an EMB 1100 with error correcting circuitry implemented in soft logic. An ECC generator 1102 and ECC corrector 1104 can be implemented outside of EMB 1100 by a computer aided design (CAD) system in the soft logic (e.g., using logic elements) of the programmable logic IC. For example, an EMB 1100 that provides read/write access to 8-bit wide words should also be able to provide access to 12-bit wide words to support the storage of error-corrected 8-bit wide words (e.g., 8 data bits and 4 error check bits per word). Implementing error correcting circuitry in soft logic (FIG. 11) rather than in hard logic (FIG. 10) advantageously reduces the required size of the programmable logic IC. However, using soft logic results in slower logic that consumes soft logic resources.

Figure 12:
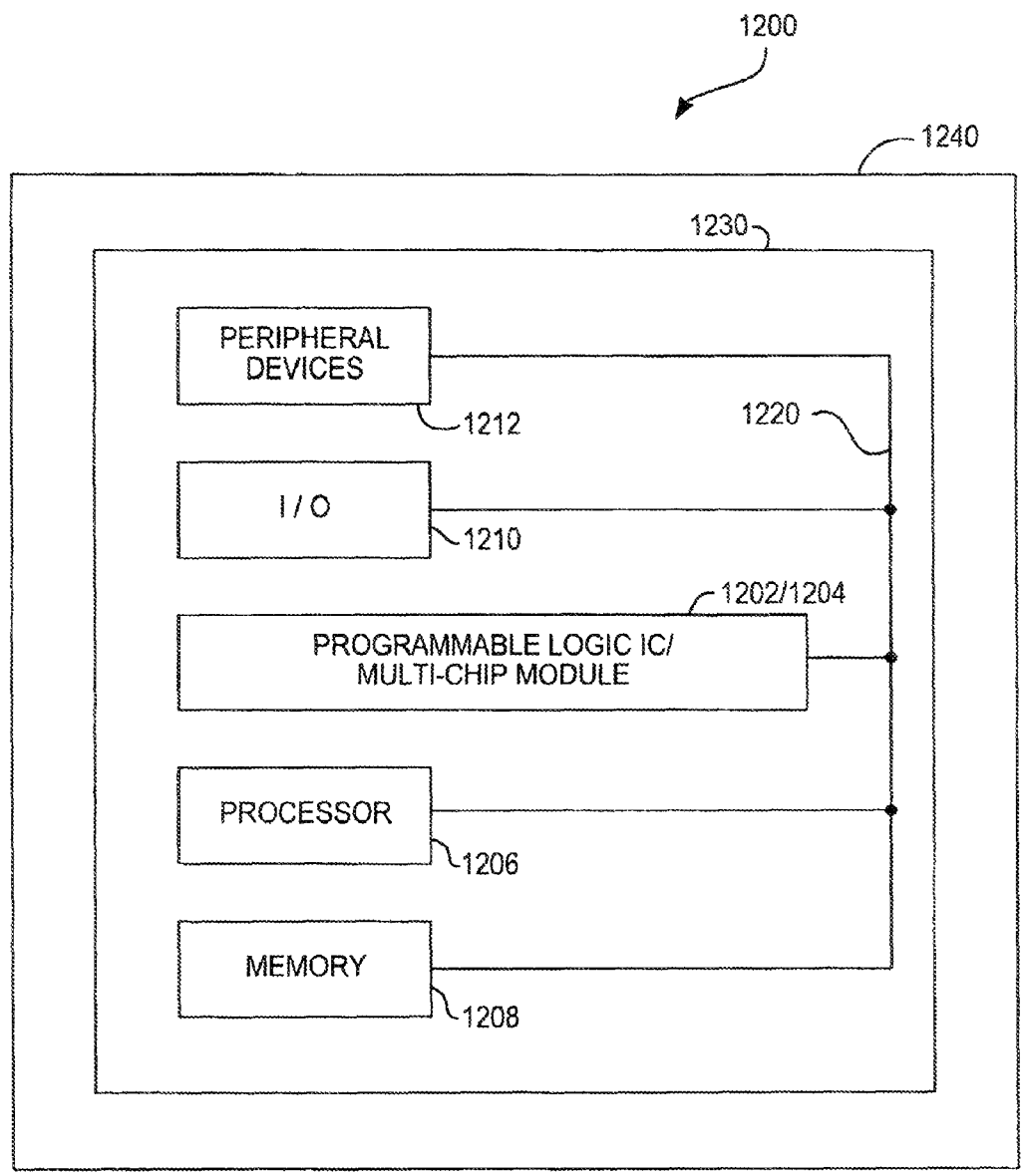
FIG. 12 is a simplified block diagram of an illustrative system employing circuitry in accordance with the invention.

FIG. 12 illustrates a programmable logic IC 1202, multi-chip module 1204, or other device (e.g., ASSP, ASIC, full-custom chip, dedicated chip). which includes embodiments of this invention in a data processing system 1200. Data processing system 1200 can include one or more of the following components: a processor 1206, memory 1208, I/O circuitry 1210, and peripheral devices 1212. These components are coupled together by a system bus or other interconnections 1220 and are populated on a circuit board 1230 which is contained in an end-user system 1240.

System 1200 can be used in a wide variety of applications, such as computer networking, data networking, instrumentation, video processing, digital signal processing, or any other application where the advantage of using programmable or reprogrammable logic is desirable. Programmable logic IC/module 1202/1204 can be used to perform a variety of different logic functions. For example, programmable logic IC/module 1202/1204 can be configured as a processor or controller that works in cooperation with processor 1206. Programmable logic IC/module 1202/1204 may also be used as an arbiter for arbitrating access to a shared IC in system 1200. In yet another example, programmable logic IC/module 1202/1204 can be configured as an interface between processor 1206 and one of the other components in system 1200. It should be noted that system 1200 is only exemplary, and that the true scope and spirit of the invention should be indicated by the following claims.

Thus it is seen that circuitry is provided that detects and corrects errors in programmable logic ICs. One skilled in the art will appreciate that the invention can be practiced by other than the prescribed embodiments, which are presented for purposes of illustration and not of limitation, and the invention is limited only by the claims which follow.

What is claimed is:

1. A circuit that corrects errors in configuration data stored on a programmable logic integrated circuit device, the circuit comprising:
   memory including memory cells on the programmable logic integrated circuit device, in which the configuration data are stored, and memory cells on the programmable logic integrated circuit device, in which error check data associated with the configuration data are stored; and
   error correction circuitry coupled to at least some of the memory to analyze the configuration data stored in the memory to determine if any values have changed after initial storage of the configuration data in the memory and to correct any values that have changed, wherein the error correction circuitry comprises at least one scrubbing circuit operative to:
   read from the memory a portion of the configuration data and an associated portion of the error check data; and
   apply an error correcting code on the portion of the configuration data and the associated portion of the error check data to determine whether at least one bit in the portion of the configuration data has an error and to correct the at least one bit that has the error.

2. The circuit of claim 1 wherein the scrubbing circuit is associated with a subset of the configuration data and an associated subset of the error check data.

3. A digital processing system comprising:
   processing circuitry;
   another memory coupled to the processing circuitry; and
   the programmable logic integrated circuit device having the circuit that corrects errors as defined in claim 1 coupled to the processing circuitry and the another memory.

4. A printed circuit board on which is mounted the programmable logic integrated circuit device having a circuit that corrects errors as defined in claim 1.

5. The printed circuit board defined in claim 4 further comprising:
   another memory mounted on the printed circuit board and coupled to the programmable logic integrated circuit device.

6. The printed circuit board defined in claim 4 further comprising:
   processing circuitry mounted on the printed circuit board and coupled to the programmable logic integrated circuit device.

7. A circuit that corrects errors in configuration data stored on a programmable logic integrated circuit device, the circuit comprising:
   memory including memory cells on the programmable logic integrated circuit device, in which the configuration data are stored, and memory cells on the programmable logic integrated circuit device, in which error check data associated with the configuration data are stored; and
   at least one scrubber coupled to the memory and operative to:
   read from the memory a portion of the configuration data and an associated portion of the error check data, and
   apply an error correcting code on the portion of the configuration data and the portion of the error check data to determine whether at least one bit in the portion of the configuration data has an error and to correct the at least one bit that has the error.

8. The circuit of claim 7 further comprising one scrubber associated with the portion of the configuration data and the associated portion of the error check data.

9. The circuit of claim 7 further comprising more than one scrubber each associated with a subset of the portion of the configuration data and an associated subset of the associated portion of the error check data.

10. The circuit of claim 7 wherein the error correcting code is one of a Hamming Code, a Reed-Solomon Code, and a Product Code.

11. A method for correcting errors in configuration data stored on a programmable logic integrated circuit device, the method comprising:
    generating error check data associated with the configuration data and storing the error check data in memory including memory cells on the programmable logic integrated circuit device, in which the configuration data are stored, and memory cells on the programmable logic integrated circuit device, in which error check data associated with the configuration data are stored;
    reading a portion of the configuration data and an associated portion of the error check data;
    determining if an error has occurred based on the portion of the configuration data and the associated portion of the error check data, wherein the determining comprises applying an error correcting code on the portion of the configuration data and the associated portion of the error check data; and
    correcting the portion of the configuration data in response to the determining.

12. The method of claim 11 wherein the portion of the configuration data comprises at least one representative column of cells in the memory.

13. The method of claim 11 wherein the portion of the configuration data comprises at least one partial representative column of cells in the memory.

14. The method of claim 11 wherein the portion of the configuration data comprises at least two partial representative columns of cells in the memory that are physically contiguous.

15. The method of claim 11 wherein the error correcting code is one of a Hamming Code, a Reed-Solomon Code, and a Product Code.

16. The method of claim 11 wherein the correcting comprises writing the corrected portion of the configuration data into the memory.

17. A method for correcting errors in configuration data stored on a programmable logic integrated circuit device, the method comprising:
    computing a first parity on each representative row of memory cells on the programmable logic integrated circuit device, in which the configuration data are stored; and
    computing a second parity on each representative column of memory cells on the programmable logic integrated circuit device, in which the configuration data are stored; wherein:
    a parity bit associated with a respective one of each representative row and each representative column of memory cells on the programmable logic integrated circuit device is stored in a respective memory cell on the programmable logic integrated circuit device as error check data associated with the respective one of the representative row and the representative column of configuration data; said method further comprising:
    determining in parallel if an error has occurred in a cell associated with a respective one of each representative row and each representative column based on the first parity and the second parity; and correcting the configuration data in the cell in response to the determining.

18. The method of claim 17 wherein the parity bit associated with each representative row and each representative column is a logic value that allows the associated representative row or representative column to have one of even parity and odd parity.

19. The method of claim 17 wherein correcting the configuration data comprises inverting the logic of the configuration data in the cell for output.

20. The method of claim 17 wherein correcting the configuration data comprises writing the corrected configuration data into the cell.

21. A method for correcting errors in configuration data stored on a programmable logic integrated circuit device, the method comprising:

computing a first parity on all but one cell in each representative row of memory cells on the programmable logic integrated circuit device; and computing a second parity on all but the one cell in each representative column of memory cells on the programmable logic integrated circuit device; wherein:

a parity bit associated with a respective one of each representative row and each representative column of memory cells on the programmable logic integrated circuit device is stored in a respective memory cell on the programmable logic integrated circuit device as error check data associated with the respective one of the representative row and the representative column of configuration data; said method further comprising:

determining in parallel if an error has occurred in the one cell associated with a respective one of each representative row and each representative column based on the first parity, the second parity, and configuration data in the one cell; and generating a correct value for the configuration data in the one cell based on the first parity, the second parity, and the configuration data in the one cell.

22. The method of claim 21 wherein the parity bit associated with each representative row and each representative column is a logic value that allows the associated representative row or representative column to have one of even parity and odd parity.

23. The method of claim 21 further comprising writing the corrected configuration data into the one cell.

* * * * *